(12) United States Patent
Postberg

(10) Patent No.: US 10,859,196 B2
(45) Date of Patent: Dec. 8, 2020

(54) RETRACTABLE FITTING HAVING A STOPCOCK

(71) Applicant: Postberg + Co. GmbH, Kassel (DE)

(72) Inventor: Hans-Jürgen Postberg, Bad Nauheim (DE)

(73) Assignee: POSTBERG + CO. GMBH, Kassel (DE)

( * ) Notice: Subject to any disclaimer, the term of this patent is extended or adjusted under 35 U.S.C. 154(b) by 180 days.

(21) Appl. No.: 16/027,917

(22) Filed: Jul. 5, 2018

(65) Prior Publication Data

US 2019/0011072 A1    Jan. 10, 2019

(30) Foreign Application Priority Data

Jul. 5, 2017 (DE) .......................... 10 2017 114 977

(51) Int. Cl.
*G01D 11/30* (2006.01)
*F16L 41/16* (2006.01)
(Continued)

(52) U.S. Cl.
CPC ............. *F16L 41/16* (2013.01); *F16L 41/008* (2013.01); *F16L 41/18* (2013.01); *F16L 55/1022* (2013.01); *F16L 55/46* (2013.01); *G01D 11/30* (2013.01); *F16L 27/04* (2013.01); *F16L 55/00* (2013.01); *F17D 5/00* (2013.01); *G01F 1/6847* (2013.01); *G01F 15/14* (2013.01)

(58) Field of Classification Search
CPC ... F17D 5/00; F16L 55/00; F16L 27/04; F16L 41/008; F16L 41/16; F16L 41/18; G01D 11/30
See application file for complete search history.

(56) References Cited

U.S. PATENT DOCUMENTS 2,770,532 A * 11/1956 Mason .................... G01N 17/00
                                                              422/53
3,430,917 A *  3/1969 Pellett .................... F16L 41/008
                                                              251/149.6
(Continued)

FOREIGN PATENT DOCUMENTS

CN           103443597 A      12/2013
CN           106838501 A       6/2017
(Continued)

*Primary Examiner* — Matthew W Jellett
*Assistant Examiner* — Christopher D Ballman
(74) *Attorney, Agent, or Firm* — Dinsmore & Shohl LLP

(57) ABSTRACT

A retractable fitting with a stopcock has a stopcock housing for connection to a pipe or process chamber. The housing has a connection opening into the pipe or process chamber. A shut-off body is rotatable about a pivot axis relative to the stopcock housing, and has a passage hole that merges in an open state of the stopcock into the connection opening of the stopcock housing, the connection opening being closed by the shut-off body in a closed state. A support element in the passage hole is introduced in the open state through the connection opening into the pipe or process chamber. A plurality of flushing lines are operable to conduct a flushing medium, the plurality of flushing lines being accessible from outside of the stopcock and being connected to and/or opening into the passage hole of the shut-off body at least in the closed state of the stopcock.

18 Claims, 7 Drawing Sheets

(51) Int. Cl.
*F16L 41/00* (2006.01)
*F16L 55/46* (2006.01)
*F16L 55/10* (2006.01)
*F16L 41/18* (2006.01)
*G01F 1/684* (2006.01)
*G01F 15/14* (2006.01)
*F17D 5/00* (2006.01)
*F16L 55/00* (2006.01)
*F16L 27/04* (2006.01)

(56) References Cited

U.S. PATENT DOCUMENTS

| | | | | |
|---|---|---|---|---|
| 3,691,846 A * | 9/1972 | Ingold | ............... | G01F 23/00 73/866.5 |
| 3,747,411 A * | 7/1973 | McDermott | ............... | G01N 1/20 73/863.54 |
| 4,071,012 A * | 1/1978 | Cooke | ............... | F16L 41/12 137/321 |
| 4,177,676 A * | 12/1979 | Welker | ............... | G01F 1/10 73/198 |
| 4,370,893 A * | 2/1983 | Combes | ............... | G01F 1/42 73/432.1 |
| 4,384,591 A * | 5/1983 | Tan | ............... | F16L 27/093 137/322 |
| 4,476,730 A * | 10/1984 | Brumm | ............... | G01F 1/42 138/94 |
| 4,697,465 A * | 10/1987 | Evans | ............... | G01N 17/00 422/53 |
| 4,917,539 A * | 4/1990 | de la Salle | ............... | H02G 1/08 405/154.1 |
| 5,150,989 A * | 9/1992 | Long, Jr. | ............... | E03F 3/06 405/154.1 |
| 5,385,060 A * | 1/1995 | Wang | ............... | E21B 33/068 73/866.5 |
| 5,507,534 A * | 4/1996 | Reifenberger | ............... | F16L 27/04 285/122.1 |
| 5,560,392 A | 10/1996 | Spang et al. | | |
| 5,612,499 A * | 3/1997 | Andrew | ............... | F16L 55/30 137/318 |
| 5,778,933 A * | 7/1998 | Crane | ............... | G01F 1/42 138/44 |
| 5,806,896 A * | 9/1998 | Sato | ............... | F16L 27/04 285/133.3 |
| 5,936,168 A * | 8/1999 | Welker | ............... | G01F 1/05 73/866.5 |
| 6,357,470 B1 * | 3/2002 | Evans | ............... | F16L 41/16 137/315.01 |
| 8,098,063 B2 * | 1/2012 | Paulson | ............... | F16L 55/48 324/220 |
| 8,720,953 B2 * | 5/2014 | Alexander | ............... | E21B 17/085 285/261 |
| 9,242,318 B2 * | 1/2016 | Mikaelsen | ............... | B23P 17/04 |
| 9,335,189 B2 * | 5/2016 | Postberg | ............... | F16L 41/16 |
| 9,604,858 B2 * | 3/2017 | Kamen | ............... | C02F 1/041 |
| 9,761,336 B2 * | 9/2017 | Caine | ............... | F16L 41/082 |
| 10,060,565 B2 * | 8/2018 | Bishop, Jr. | ............... | B60K 15/04 |
| 10,180,414 B2 * | 1/2019 | Clark | ............... | F17D 5/00 |
| 10,203,315 B2 * | 2/2019 | Clark | ............... | F17D 5/00 |
| 10,317,003 B2 * | 6/2019 | Loga | ............... | F16L 55/07 |
| 10,563,803 B2 * | 2/2020 | Gorintin | ............... | F16L 41/04 |
| 2011/0187096 A1 * | 8/2011 | Lillejordet | ............... | F16L 1/26 285/39 |
| 2015/0044013 A1 * | 2/2015 | Perkins | ............... | B25J 11/00 414/800 |
| 2017/0121168 A1 * | 5/2017 | Johnson | ............... | B65D 75/5877 |
| 2019/0331281 A1 * | 10/2019 | Heffernan | ............... | F16L 41/06 |
| 2020/0049259 A1 * | 2/2020 | Yokoyama | ............... | F16K 27/02 |

FOREIGN PATENT DOCUMENTS

| | | |
|---|---|---|
| DE | 102013103459 A1 | 10/2014 |
| EP | 1030289 A2 | 8/2000 |
| IE | 10019991 A1 | 1/2002 |
| WO | 2012098084 A1 | 7/2012 |

\* cited by examiner

RETRACTABLE FITTING HAVING A STOPCOCK

CROSS REFERENCE TO RELATED APPLICATIONS

This application claims priority to German patent application no. DE 10 2017 114 977.5 filed Jul. 5, 2017 the entire content of which is incorporated herein by reference.

FIELD OF THE INVENTION

The invention relates to a retractable fitting having a stopcock that comprises a stopcock housing connected to a pipe or to a process chamber and a shut-off body that is arranged therein, that is rotatable about a pivot axis relative thereto, and that has a passage hole that merges in an open state of the stopcock into a connection opening that is provided in the stopcock housing, that opens into the pipe or process chamber, and that is closed by the shut-off body in a closed state of the stopcock, and having a support element that is arranged in the passage hole and that can be introduced in the open state of the stopcock through the connection opening into the pipe or process chamber.

BACKGROUND OF THE INVENTION

Such a retractable fitting is e.g. known from WO 2012/098084 A1, wherein a remainder of the fluid flowing in the pipe remains within the stopcock as a rule after the closing of the stopcock. This can be dangerous for the service engineer on the removal of the support element if the fluid is toxic or flammable. The support element furthermore e.g. supports an object, preferably configured as a sensor, that is in particular introduced into the pipe in operation in accordance with its intended purpose. If the object has to be regularly cleaned and has to be removed from the retractable fitting for this purpose, a not insubstantial effort that is unwanted is associated with the cleaning.

SUMMARY OF THE INVENTION

Starting from this, it is the underlying object of the invention to further develop a retractable fitting of the initially named kind such that an endangering of service engineers on the removal of the support element is even avoidable when a toxic or flammable fluid has been introduced into the pipe or process chamber and/or such that the effort for the cleaning of an object supported by the support element can be reduced.

This object is achieved by a retractable fitting as described herein. Preferred further developments of the retractable fitting are given in the following description.

The initially named retractable fitting comprising—a stopcock that comprises a stopcock housing connected to a pipe or process chamber and a shut-off body that is arranged therein, that is rotatable about a pivot axis relative thereto, and that has a passage hole that merges in an open state of the stopcock into a connection opening that opens into the pipe or process chamber and that is provided in the stopcock housing and that is closed by the shut-off body in a closed state of the stopcock; and—a support element that is arranged in the passage hole and that can be introduced in the open state of the stopcock through the connection opening into the pipe or process chamber; is in particular further developed in accordance with the invention such that—a plurality of flushing lines through which a flushing medium can be conducted and which is accessible from the outside is provided in the closed state or only in the closed state or at least in the closed state of the stopcock and is connected to the passage hole and/or opens into the passage hole. Accessible from the outside means in particular from outside the stopcock and/or the stopcock housing.

The support element and/or the passage hole and/or a region adjoining the passage hole in the interior of the closed stopcock can be flushed with the flushing medium by the provision of the flushing lines. A remainder of a fluid that is introduced into the pipe or process chamber and that is enclosed in the closed stopcock can thus be flushed so that subsequent removal of the support element is also not dangerous when a toxic or flammable fluid has been introduced into the pipe or process chamber. An object such as a sensor supported by the support element can furthermore be cleaned by the flushing medium without having to remove it from the retractable fitting. An or the inner space of the stopcock and/or of the stopcock housing or a part of this inner space and/or the passage hole preferably forms/form or comprises/cormprise a flushing chamber, in particular in the closed state of the stopcock, that is preferably accessible via the flushing lines. The flushing medium is preferably a gas (flushing gas) or a liquid (flushing liquid).

The support element is preferably guided displaceably in the passage hole and/or in the shut-off body. This guidance e.g. takes place by the shut-off body or by a or at least one guide element provided at or in the shut-off body. The flushing lines are preferably closable, for example by means of a or of a respective one closure element and/or closure mechanism.

The or a fluid is preferably introduced into the pipe or process chamber. The fluid is e.g. a gas or a liquid. The fluid is in particular pressurized or at excess pressure. The fluid can alternatively, however, also be at environmental pressure or at a vacuum. A flammable and/or toxic fluid is introduced into the pipe or process chamber, for example. Compressed air is e.g. alternatively introduced into the pipe or process chamber. The fluid preferably differs from the flushing medium and/or the fluid and the flushing medium are preferably different.

The process chamber is advantageously a container, preferably a closed container, and/or a vessel, preferably a closed vessel. The process chamber is a tank, for example. Physical and/or thermodynamic and/or chemical and/or biological and/or biochemical processes or procedures run in the process chamber and/or the process chamber is e.g. suitably configured so that these processes or procedures can run in it.

The number of flushing lines preferably amounts to two, at least two, or three, or at least three. The flushing lines in particular comprise a or at least one inlet through which the flushing medium can be conducted and a or at least one outlet through which the flushing medium can be conducted out. The support element is advantageously sealed with respect to or at the shut-off body, in particular with respect to the environment, directly or indirectly for example. The support element is of sleeve shape and/or of pipe shape, for example. The support element preferably is or forms or comprises a pipe. The support element is also e.g. called an immersion pipe. The shut-off body is preferably pivotable together with the support element about the pivot axis.

The stopcock housing preferably comprises and/or surrounds the or an inner space. The shut-off body is in particular arranged in the inner space of the stopcock housing. The stopcock is preferably or preferably forms a ballcock. The shut-off body is preferably spherical, in particular at least regionally.

In accordance with an embodiment, the shut-off body is supported pivotably about the pivot axis at or in the stopcock housing by one or more, preferably two, bearing pins. The bearing pin in particular extends or the bearing pins in particular each extend in the direction of the pivot axis. The bearing pin advantageously forms or the bearing pins advantageously each form a part of the shut-off body. For example, the bearing pin or bearing pins is/are connected to the shut-off body with material continuity and/or with material homogeneity and/or is/are formed in one piece with the shut-off body. The bearing pin or bearing pins advantageously projects/project or protrudes/protrude from the shut-off body. The bearing pin in particular lies in or the bearing pins in particular each lie, preferably slidably, in a bearing recess provided in the stopcock housing or in bearing recesses provided in the stopcock housing. The or each bearing recess or at least one of the bearing recesses is preferably continuous. The bearing pins are preferably provided at mutually oppositely disposed sides of the shut-off body. The bearing recesses are preferably provided at mutually oppositely disposed sides of the shut-off body.

In accordance with a further development, one of the flushing lines extends through the or through each or through one or at least one of bearing pins and/or the or each bearing pin forms one of the flushing lines or a part of one of the flushing lines. Leading the respective flushing line or flushing lines over the interface between the stopcock housing and the shut-off body is thus avoidable.

A longitudinal axis that in particular extends in an axial direction is preferably associated with the stopcock housing. The longitudinal axis of the stopcock housing advantageously extends, preferably centrally, through the connection opening. A or each direction extending transversely to the axial direction and/or transversely to the longitudinal axis of the stopcock housing is in particular designated as the radial direction. The pivot axis preferably extends transversely to the longitudinal axis of the stopcock housing.

The stopcock and/or the stopcock housing is/are advantageously fastened, in particular externally, to the pipe or process chamber. The stopcock and/or the stopcock housing is/are, for example, fastened to the pipe or process chamber with the interposition of at least one pipe section and/or flange. The connection opening in particular opens directly or indirectly into the pipe or process chamber. For example, the connection opening opens into the pipe or process chamber with the interposition of at least a or of the at least one pipe section and/or flange.

In accordance with a further development, a or at least one of the flushing lines or a or at least one other one of the flushing lines extends, preferably transversely or obliquely to the connection opening and/or transversely or obliquely to the longitudinal axis of the stopcock housing and/or transversely or obliquely to the axial direction, through the stopcock housing and/or through a wall of the stopcock housing and/or into the stopcock housing. This or this at least one flushing line or other flushing line preferably opens into the inner space of the stopcock housing. This or this at least one flushing line or other flushing line preferably opens, in particular in the closed state of the stopcock, into an opening, preferably a front-side opening, of the passage hole and/or adjoins the or an opening, preferably the or a front-side opening, of the passage hole. This opening of the passage hole is in particular a pipe or process chamber and/or an opening of the passage hole facing the stopcock housing. This or this at least one flushing line or other flushing line can also e.g. be used for venting. This or this at least one or other flushing line is in particular a venting line.

In accordance with an embodiment, a guide pipe is provided that is connected, preferably releasably, to the shut-off body and/or is inserted into the passage hole and/or adjoins the passage hole and/or merges into the passage hole. For example, the inner pipe space of the guide pipe merges into the passage hole and/or the passage hole e.g. merges into the inner pipe space of the guide pipe. The support element is in particular displaceably guided in the guide pipe. The guide pipe thus advantageously forms the or a guide element. The guide pipe is preferably separable from the shut-off body, in particular in the closed state of the stopcock, preferably together with the support element. The support element is advantageously protected or protectable against external influences by the guide pipe, in particular after the separation from the shut-off body. The guide pipe, for example, forms a cartridge or detachable cartridge, preferably together with the support element. The shut-off body is preferably pivotable about the pivot axis together with the guide element.

An adjustment apparatus is preferably provided by means of which the support element is displaceable in the guide pipe. The adjustment apparatus is in particular connected between the support element and the guide pipe and/or between the support element and the shut-off body. The adjustment apparatus is, for example, manually or automatically and/or electrically and/or pneumatically and/or hydraulically actuable. The adjustment apparatus can e.g. be attributed to the cartridge or detachable cartridge.

In accordance with a further development, a or at least one flushing hole that is preferably continuous or a plurality of flushing holes that are preferably continuous is/are provided in the wall of the guide pipe. One of the flushing line in particular opens into the or into the at least one or into each flushing hole, preferably respectively. One of the flushing lines is advantageously connected to the or to the at least one or to each flushing hole, preferably respectively. The flushing medium can thus be guided to the support element, in particular through the flushing hole or flushing holes. This flushing line or these flushing lines is/are in particular the flushing line or flushing lines that extends or extend through the bearing pin or bearing pins.

in accordance with an embodiment, the support element has a cover at one of its ends by which the passage hole and/or the guide pipe can be closed, in particular at its end facing the shut-off body and/or the stopcock and/or the pipe or process chamber. This end of the support element, in particular provided with the cover, is preferably the pipe or process chamber and/or the end of the support element facing the stopcock and/or the shut-off body. The protection of the support element against external influences can hereby be increased, in particular after the separation from the shut-off body.

In accordance with a further development, the support element is sealed, for example directly or indirectly, with respect to the guide pipe, preferably by means of at least one seal ring. The guide pipe is preferably sealed, for example directly or indirectly, with respect to the shut-off body, preferably by means of at least one seal ring. The shut-off body is preferably sealed, for example directly or indirectly, with respect to the stopcock housing, in particular at or in the region of the connection opening, preferably by means of a seal seat.

In accordance with an embodiment, the guide pipe is releasably connected to the shut-off body by a or by at least one fastening means. The fastening means is preferably a nut that is screwable or screwed onto a thread provided at the shut-off body. The nut is e.g. a cap nut. The thread is in particular an external thread.

A pipe socket is preferably fixedly and/or rigidly connected to the shut-off body and the guide pipe is connected, in particular releasably, by it and/or the guide pipe is inserted into it and/or the guide pipe is led through it. For example, the inner pipe space of the pipe socket merges into the passage hole and/or the passage hole e.g. merges into the inner pipe space of the pipe socket. The guide pipe is in particular releasably connected to the pipe socket by the or by the at least one fastening means. The thread is preferably provided at the pipe socket. The pipe socket is preferably provided and/or arranged at a side of the shut-off body remote from the pipe or process chamber and/or from the connection opening.

A safety housing is advantageously provided, in particular additionally, at the stopcock and/or at the stopcock housing. The or the at least one fastening means is preferably engaged in the safety housing in the open state of the stopcock. The or the at least one fastening means is advantageously disengaged from the safety housing in the closed state of the stopcock. A release of the or of the at least one fastening means can thus be avoided in the open state of the stopcock. The safety housing advantageously comprises an or at least one opening through which the fastening means can be engaged in and/or disengaged from the safety housing. The safety housing is preferably additionally provided at the stopcock and/or at the stopcock housing. Alternatively, the safety housing is e.g. formed by the stopcock and/or by the stopcock housing.

In accordance with a further development, the support element supports an or at least one sensor by means of which a or at least one physical property of the or of a fluid introduced and/or flowing into the pipe or process chamber can preferably be measured. This property is e.g. the flow rate of the fluid and/or the pressure of the fluid and/or the temperature of the fluid. The support element can thus e.g. also be designated as a sensor carrier. The guide pipe can, for example, preferably together with the support element, also be designated as a sensor cartridge or detachable sensor cartridge. Alternatively or additionally, the support element e.g. supports a sample removal chamber by means of which a sample can be taken from the or a fluid introduced into the pipe or process chamber and/or flowing into the pipe or process chamber. The sensor and/or the sample removal chamber is/are preferably arranged within the support element, in particular in an end region of the support element facing the pipe or process chamber. The support element preferably has at least one or more cut-outs in its end region facing the pipe or process chamber through which the interior of the support element and/or the sensor and/or the sample removal chamber is/are accessible. The cut-out or cut-outs e.g. form/forms or comprise/comprises at least one or more apertures and/or at least one or more holes or flushing holes. The cut-out or cut-outs is/are in particular provided in the wall of the support element. The sensor and/or the sample removal chamber is/are preferably introducible and/or insertable into the pipe or process chamber by means of the support element.

BRIEF DESCRIPTION OF THE DRAWINGS

The invention will be described in the following with reference to a preferred embodiment and to the drawing. There are shown in the drawing

DETAILED DESCRIPTION

Figure 1:
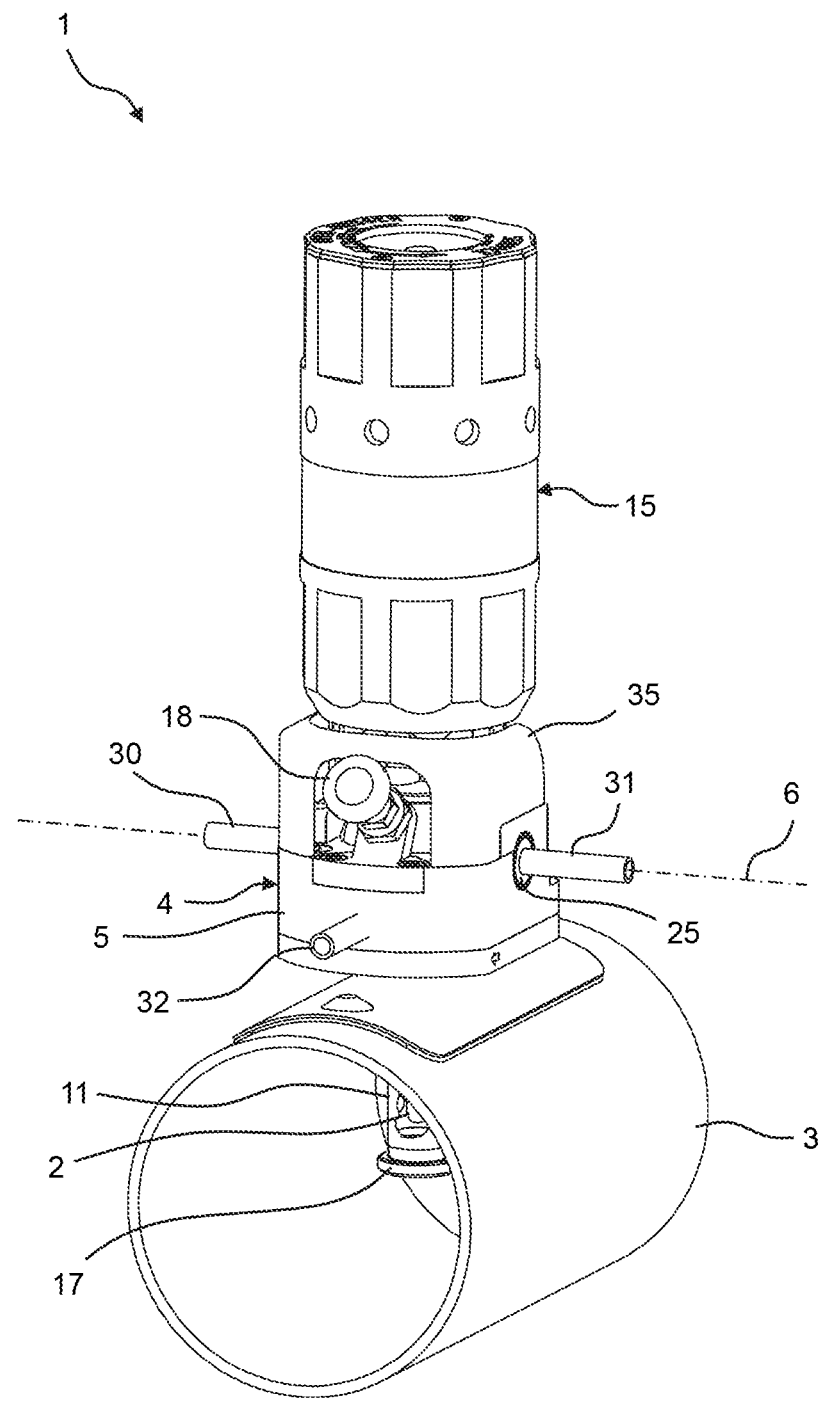
FIG. 1 is a perspective view of a retractable fitting in accordance with an embodiment, with a sensor being inserted into a pipe.
Figure 2:
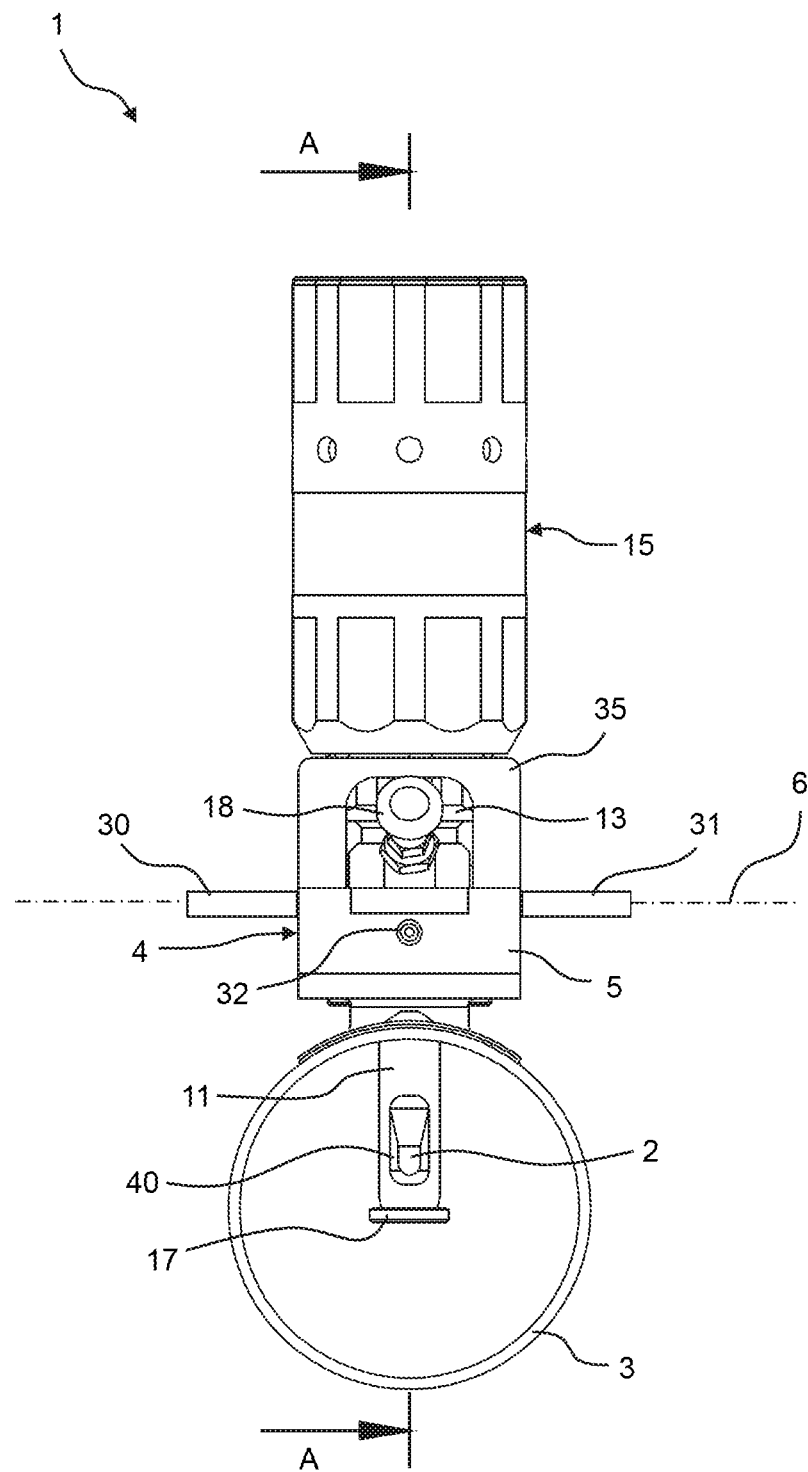
FIG. 2 is a front view of the retractable fitting in accordance with FIG. 1.
Figure 3:
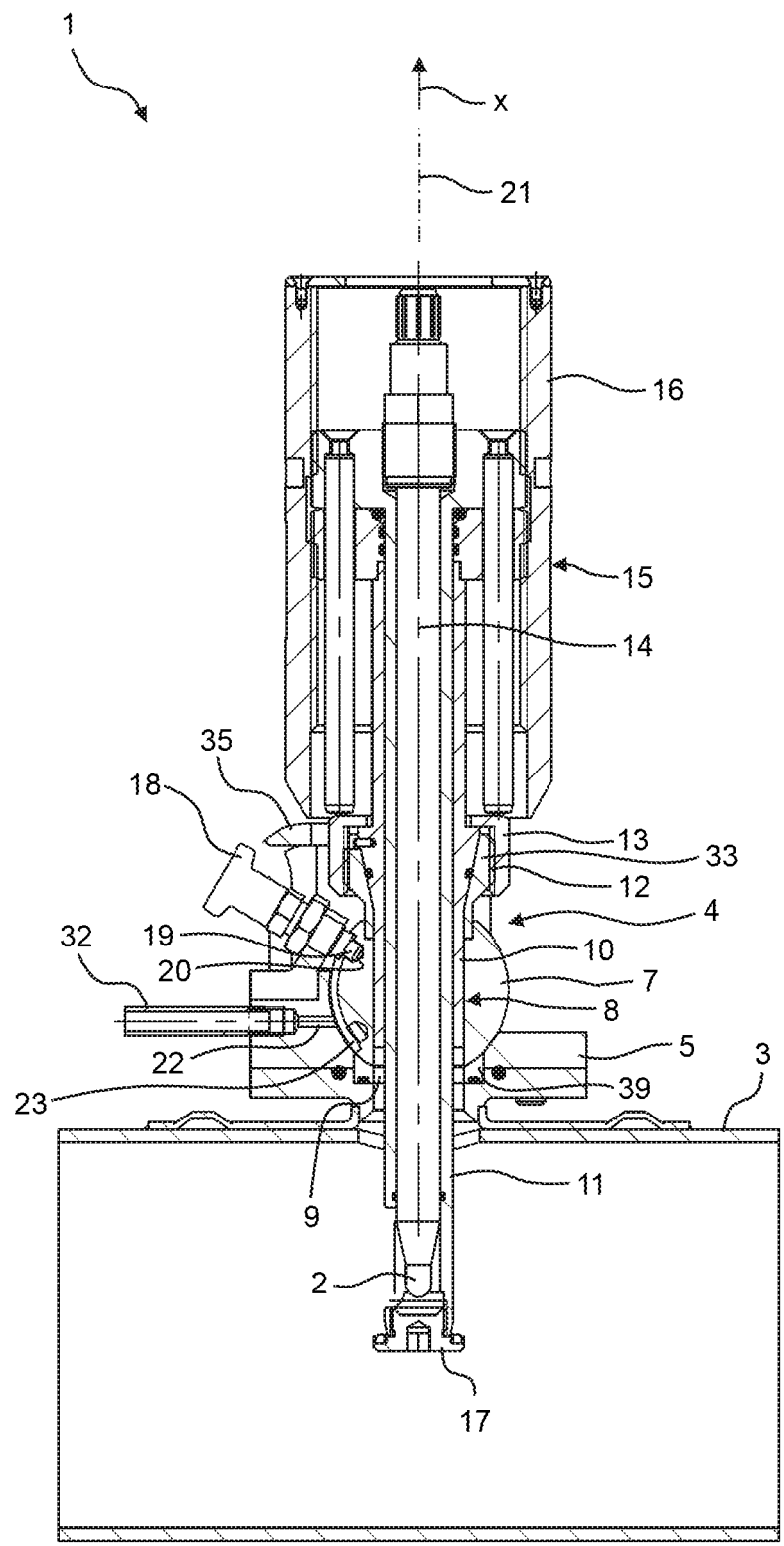
FIG. 3 is a longitudinal section through the retractable fitting along the line A-A visible from FIG. 2.

Different views of a retractable fitting 1 in accordance with an embodiment can be seen from FIGS. 1 to 3, wherein FIG. 1 shows a perspective view of the retractable fitting 1, FIG. 2 shows a front view of the retractable fitting 1, and FIG. 3 shows a longitudinal section through the retractable fitting 1 along the line A-A visible from FIG. 2. In accordance with FIGS. 1 to 3, a sensor 2 by means of which e.g. the flow rate of a gas flowing in the pipe 3 can be measured is inserted into a pipe 3.

The retractable fitting 1 has a stopcock 4 that comprises a stopcock housing 5 connected to the pipe 3 and a shut-off body 7 that is arranged therein, that is rotatable relative thereto about a pivot axis 6 and that has a passage hole 8 that merges in an open state of the stopcock 4 visible from FIGS. 1 to 3 into a connection opening 9 provided in the stopcock housing 5 and opening into the pipe 3.

Figure 8:
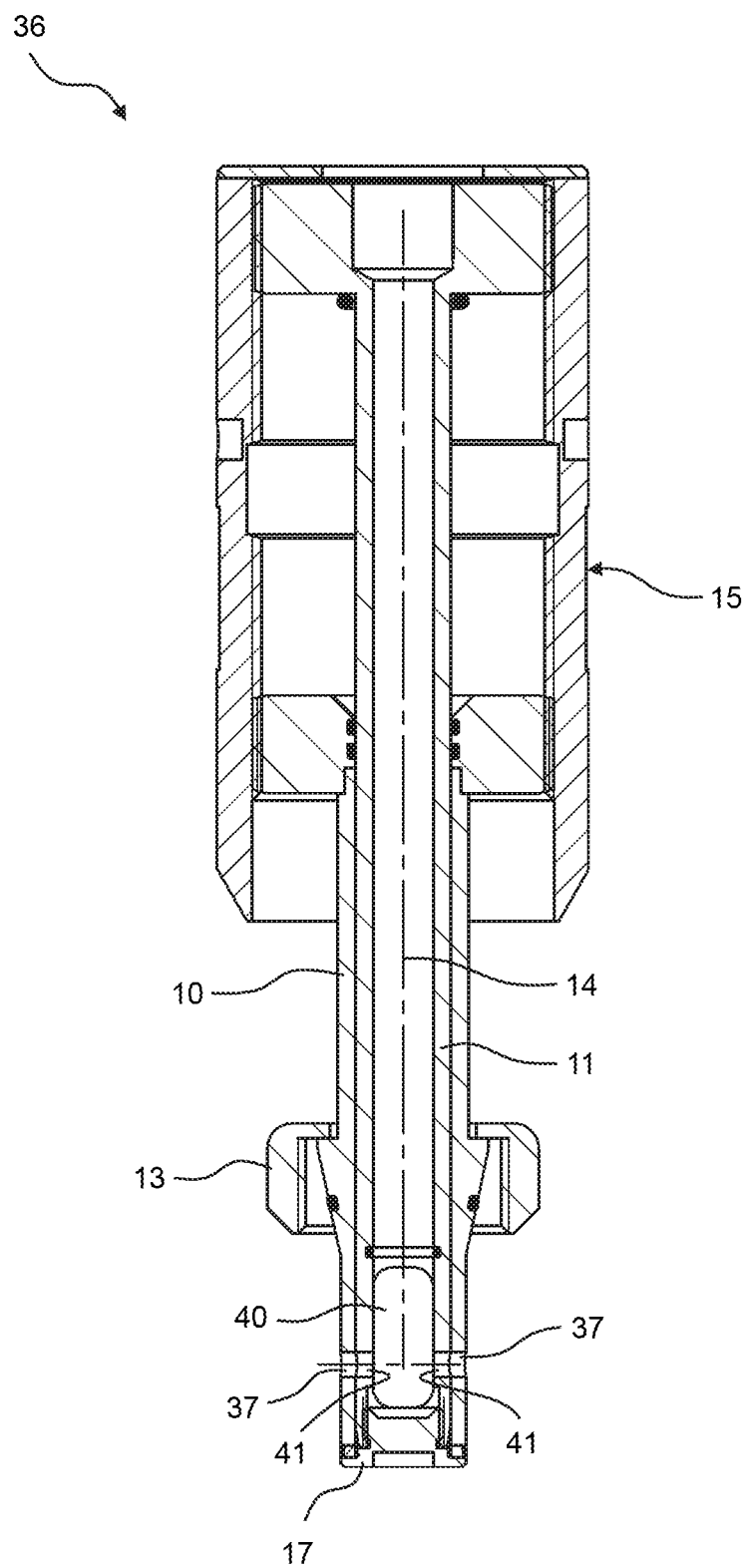
FIG. 8 is a longitudinal section through a sensor cartridge of the retractable fitting in the dismantled state.

The retractable fitting 1 further comprises a guide pipe 10 which is inserted into the passage hole 8 and in which a support element 11 is displaceably guided which supports the sensor 2. The support element 11 is here in particular itself formed as a pipe in whose inner space the sensor 2 is arranged. The support element preferably has an aperture 40 in its end region facing the pipe 3 and the sensor 2 is accessible through it. An external thread 12 onto which a fastening means 13 in the form of a cap nut is screwed by which the guide pipe 10 is secured to the shut-off body is provided at the shut-off body 7 at a side of the shut-off body 7 remote from the pipe 3 and/or from the connection opening 9. A guide pipe longitudinal axis 14 along which the support element 11 is displaceable in the guide pipe 10 is associated with the guide pipe 10. An adjustment apparatus 15 by means of which the support element 11 is displaceable in the guide pipe 10 is furthermore connected between the support element 11 and the guide pipe 10. The adjustment apparatus 15 has an outer sleeve 16 for this purpose that is rotatable about the guide pipe longitudinal axis 14, with the support element being or being able to be displaced in the guide pipe 10 in the direction of the longitudinal axis 14 by rotating the outer sleeve 16 about the guide pipe longitudinal axis 14. It can be specified by the sense of rotation here whether the support element 11 is led out of the guide pipe 10 and is this introduced into the pipe 3 or whether the support element 11 is traveled into the guide pipe 10 and is thus led out of the pipe 3. The support element 11 furthermore has a cover 17 at its end facing the pipe 3. The assembly formed from the guide pipe 10, from the support element 11, and from the adjustment apparatus 15 is in particular designated as a sensor cartridge 36 that can be seen in a single representation from FIG. 8. The sensor cartridge 36 preferably also comprises the fastening means 13. The sensor 2 can e.g. furthermore be attributed to the sensor cartridge 36.

A locking apparatus 18 is provided at the stopcock housing 5 and the shut-off body 7 is or can be locked in position in the stopcock housing 5 by means of it. For this purpose, the locking apparatus 18 engages with a locking pin 19 into a locking recess 20 provided in the shut-off body 7. The locking pin 19 can be disengaged from the locking recess by releasing the locking apparatus 18 and the shut-off body 7 is thus releasable for pivoting about the pivot axis 6.

A longitudinal axis 21 that extends in an axial direction x and that runs centrally through the connection opening 9 is furthermore associated with the stopcock housing 5. In the non-pivoted state of the retractable fitting 1 visible from FIGS. 1 to 3, the longitudinal axis 21 coincides with the guide pipe longitudinal axis 14. A venting line 22 that extends transversely to the longitudinal axis 21 is provided in the stopcock housing 5 and extends from the outside up to an inner space 23 which is provided in the stopcock housing 5 and in which the shut-off body 7 is arranged. The venting line 22 is accessible from the outside through a venting connection 32 fastened to the stopcock housing 5. In addition, a safety housing 35 into which the fastening means 13 is engaged is additionally provided at the stopcock housing 5. A release of the fastening means 13 can thereby be prevented.

Figure 4:
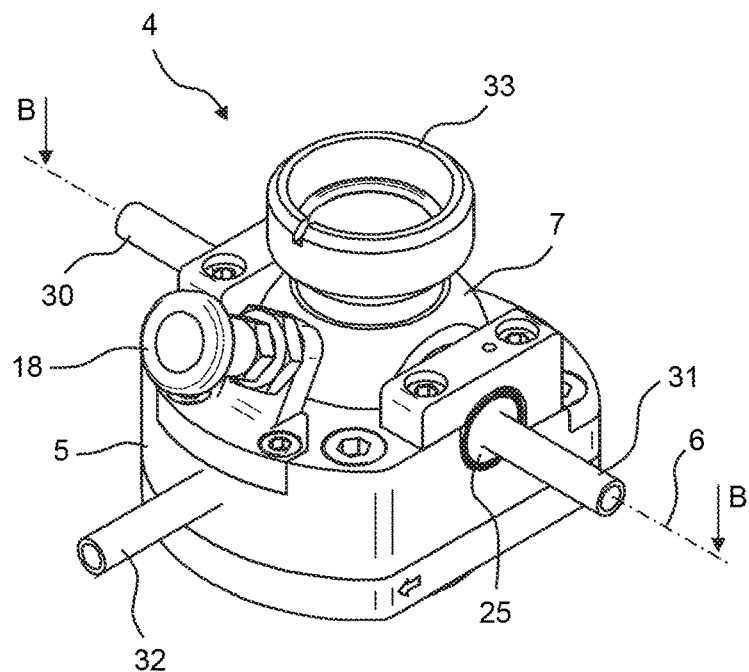
FIG. 4 is a perspective view of a stopcock of the retractable fitting.
Figure 5:
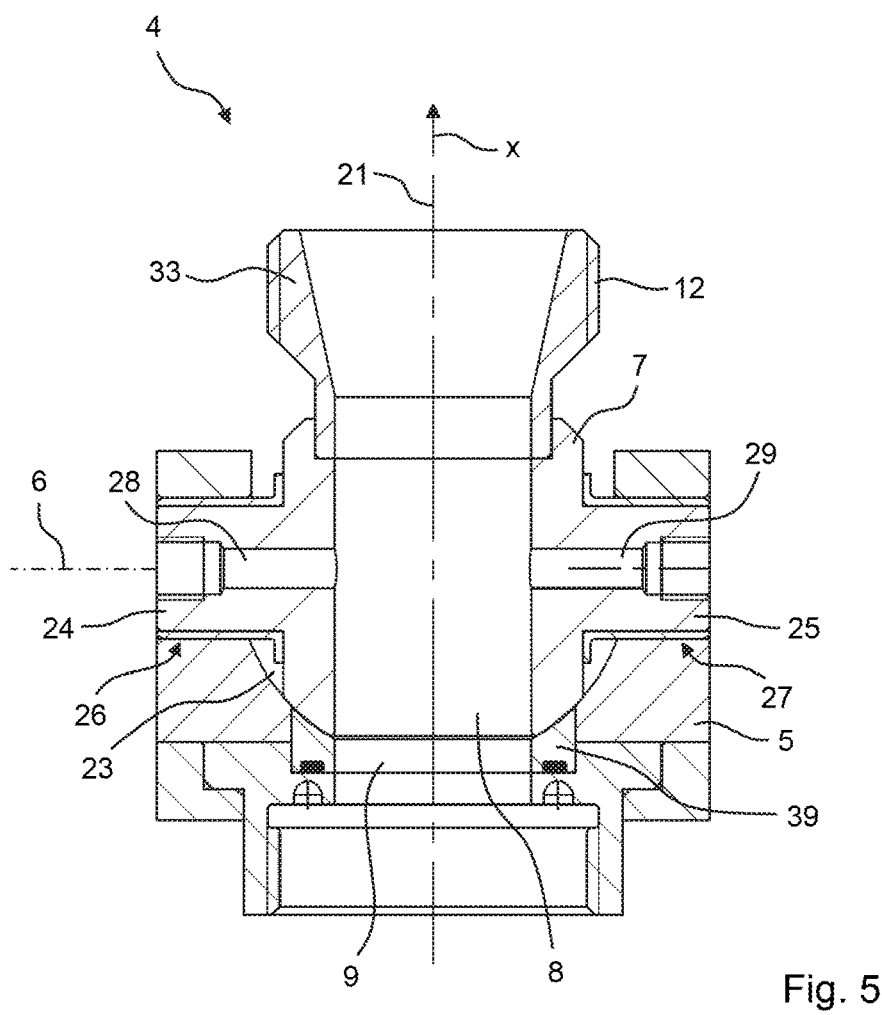
FIG. 5 is a sectional view through the stopcock along the line B-B visible from FIG. 4.

Different views of the stopcock 4 can be seen from FIGS. 4 and 5, wherein FIG. 4 shows a perspective view of the stopcock 4 and FIG. 5 shows a sectional view through the stopcock 4 along the line B-B visible from FIG. 4.

The shut-off body 7 comprises two mutually oppositely disposed projecting bearing pins 24 and 25 that extend in the direction of the pivot axis 6 and that engage into bearing recesses 26 and 27 respectively that are provided in the stopcock housing 5. The bearing pins 24 and 25 are seated in a slidable manner in the bearing recesses 26 and 27 respectively so that the shut-off body 7 is supported pivotable about the pivot axis 6 in the stopcock housing 5 by means of the bearing pins 24 and 25. Flushing lines 28 and 29 which open into the passage hole 8 extend through the bearing pins 24 and 25 and in the direction of the pivot axis 6. The flushing lines 28 and 29 are accessible from the outside by flushing connectors 30 and 31 that are fastened to the bearing pins 24 and 25 and that are not shown in FIG. 5. Furthermore, a pipe socket 33 at which the external thread 12 is provided and which adjoins the passage hole 8 is fastened to the shut-off body 7 at a side of the shut-off body 7 remote from the pipe 3 and/or from the connection opening 9. A seal seat 39 is furthermore provided by means of which the shut-off body 7 is sealed with respect to the stopcock housing 5 and which surrounds the connection opening 9. The seal seat 39 is of ring shape and is e.g. also called a seat ring. The stopcock 4 here in particular forms a ballcock. The shut-off body 7 is preferably spherical, in particular at least regionally.

Figure 6:
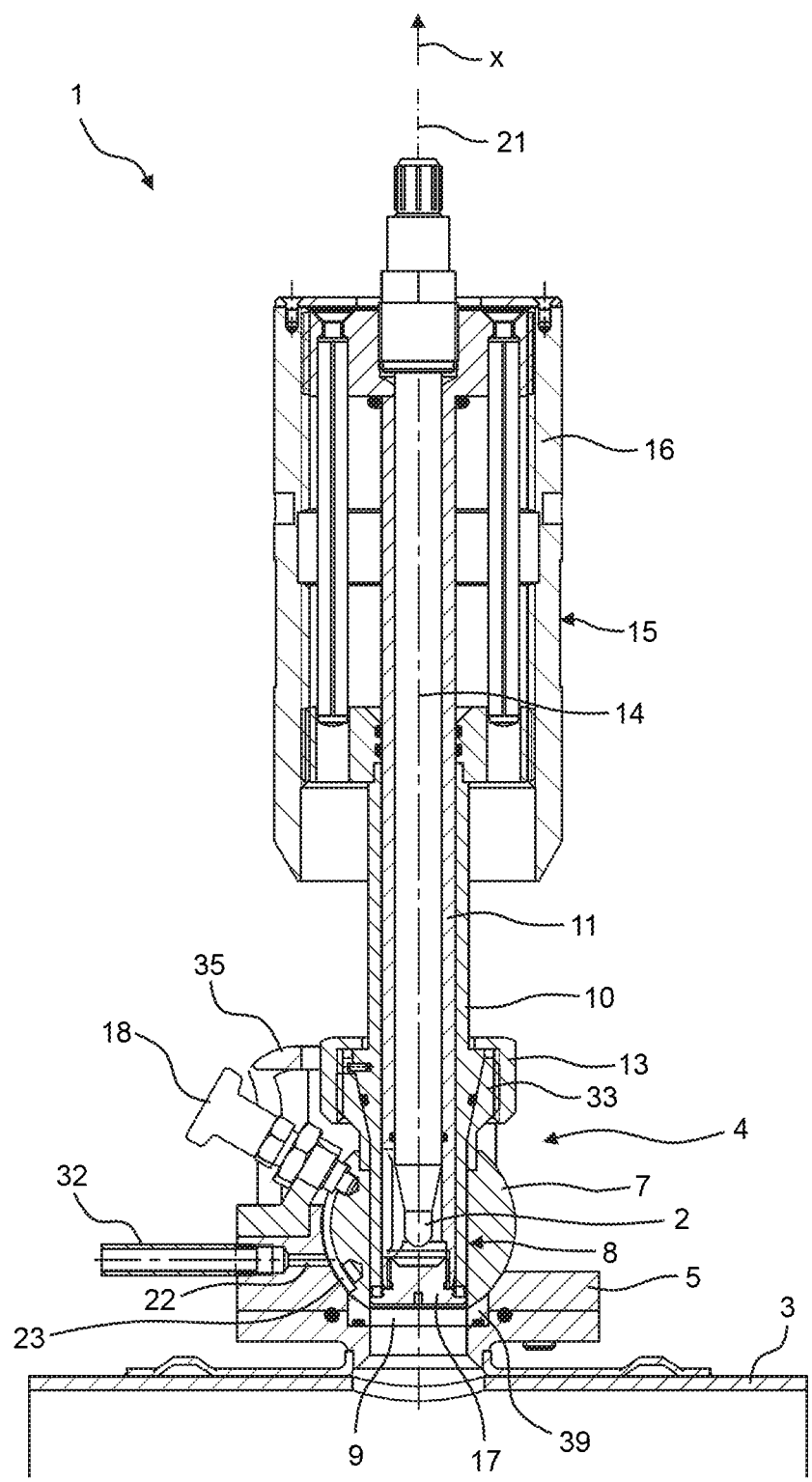
FIG. 6 is a longitudinal section through the retractable fitting, with the sensor being led out of the pipe.

A longitudinal section through the retractable fitting can be seen from FIG. 6, wherein the support element 11 is led out of the pipe 3. The sensor 2 is thus also led out of the pipe 3. The stopcock 4 is, however, still in the open state. The leading of the support element 11 out of the pipe 3 takes or took place by means of the adjustment apparatus 15 here. It can be recognized that the cover 17 contacts the guide pipe 10 at the front side and closes it.

Figure 7:
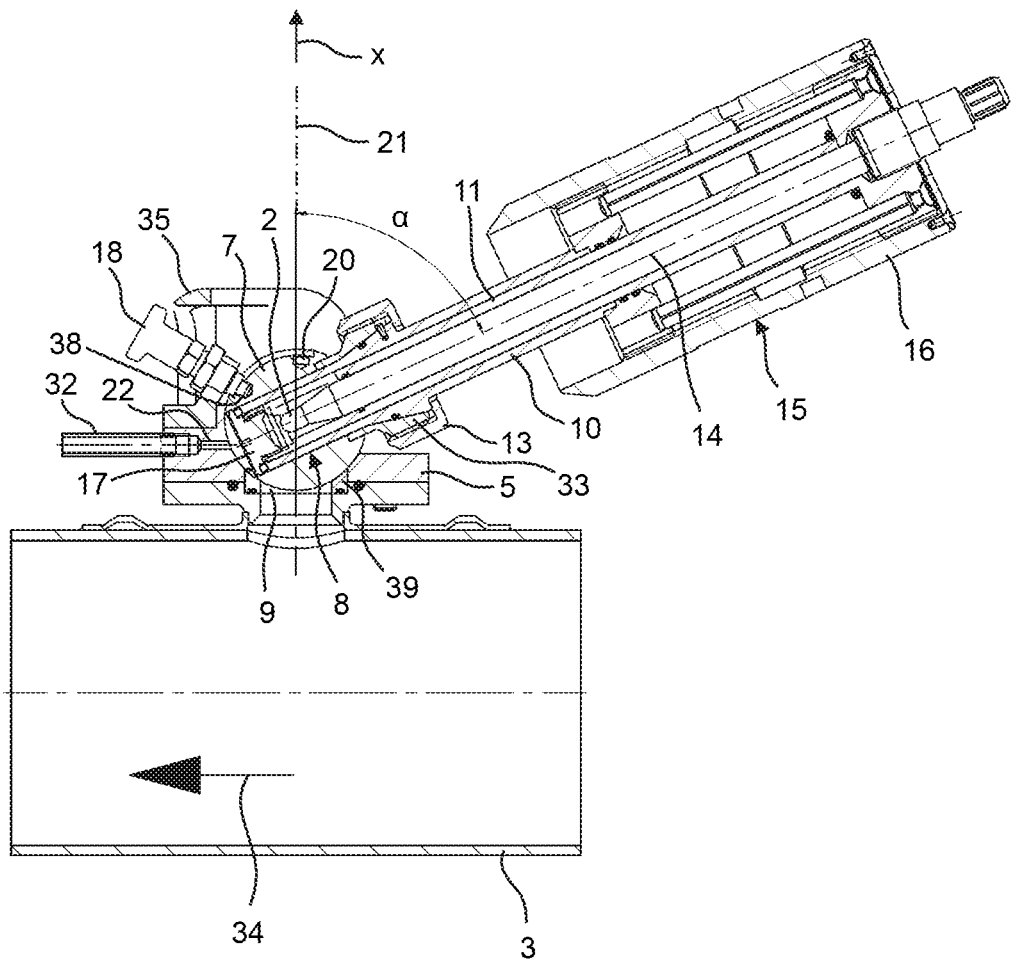
FIG. 7 is a longitudinal section through the retractable fitting in the pivoted state.

The shut-off body 7 is now pivoted together with the guide pipe 10 and with the support element 11 about the pivot axis 6, which can be seen from FIG. 7 that shows a longitudinal section through the retractable fitting 1 in the pivoted state. The pivot angle included between the guide pipe longitudinal axis 14 and the longitudinal axis 21 is marked by a. The shut-off body 7 is furthermore locked in position in the pivoted state by means of the locking apparatus 18 in that the locking pin 19 engages into another locking recess 38 provided in the shut-off body 7. The locking pin 19 can be disengaged from the locking recess 38 by releasing the locking apparatus 18 and the shut-off body 7 is thus releasable for pivoting about the pivot axis 6. The shut-off body 7 is thus lockable in position both in the open state and in the closed state at the stopcock housing 5 by means of the locking apparatus 18.

The connection opening 9 is closed by means of the shut-off body 7 by the pivoting. A remainder of the gas introduced into the pipe 3, in particular flowing in the direction of the arrow 34, however, remains within the guide pipe 10 and/or the support element 11, which is undesirable. A flushing medium is conducted through the flushing lines 28 and 29 for this reason and the guide pipe 10 and/or the support element 11 is/are flushed by means of it. The guide pipe 10 has continuous flushing holes 37 in its wall (see FIG. 8) for this purpose, said flushing holes being connected to the flushing lines 28 and 29. The support element 11 also preferably has continuous flushing holes 41 in its wall which adjoin the flushing holes 37 of the guide pipe 10 in the led-out state of the support element 11. The flushing holes 37 and 41 can be seen from FIG. 8 that shows a longitudinal section through the sensor cartridge 36 in the dismantled state.

The flushing will be described by way of an example in the following. The flushing medium is e.g. conducted into the flushing line 28, then moves through the flushing hole 37 adjoining the flushing line 28 into the guide pipe 10 and thus to the support element 11, after which the flushing medium moves through the flushing hole 37 adjoining the flushing line 29 into the flushing line 29 through which the flushing medium is conducted out. The flushing medium here preferably flows through the flushing holes 41 adjoining the flushing holes 37 and thus through the interior of the support element 11. Since the sensor 2 is arranged at or in the support element 11 in the assembled state of the sensor cartridge 36, the sensor 2 is also in particular flushed by the flushing. After the flushing, the guide pipe 10 together with the support element 11 can be separated from the shut-off body 7. This separation is now possible in a simple manner since the fastening means 13 is disengaged from the safety housing 35 in the pivoted state of the guide pipe 10 and is thus freely accessible.

The cover 17 is omitted in accordance with a variant of the embodiment. In this case, the venting line 22 opens in the pivoted state of the guide pipe 10 into the front-side opening of the guide pipe 10 facing the stopcock 4. The flushing medium is now introduced, for example, into the venting line 22, thus arrives at the support element 11, and in particular flows into it at the front side, after which the flushing medium moves, preferably after passing through one of the flushing holes 41, through the flushing hole 37 adjoining the flushing line 29 into the flushing line 29 through which the flushing medium is conducted out. The flushing medium can alternatively also be conducted out through both flushing lines 28 and 29. The flow direction of the flushing medium is furthermore reversible. The venting line 22 here in particular itself forms a flushing line.

REFERENCE NUMERAL LIST 1 retractable fitting
2 sensor 3 pipe
4 stopcock
5 stopcock housing
6 pivot axis
7 shut-off body of the stopcock
8 passage hole in the shut-off body
9 connection opening in the stopcock housing
10 guide pipe
11 support element
12 external thread
13 fastening means/cap nut
14 longitudinal axis of the guide pipe
15 adjustment apparatus
16 outer sleeve of the adjustment apparatus
17 cover of the support element
18 locking apparatus
19 locking pin
20 locking recess
21 longitudinal axis of the stopcock housing
22 venting line
23 inner space of the stopcock housing
24 bearing pin of the shut-off body
25 bearing pin of the shut-off body
26 bearing recess in the stopcock housing
27 bearing recess in the stopcock housing
28 flushing line
29 flushing line
30 flushing connector
31 flushing connector
32 venting connector
33 pipe section
34 flow direction of the gas in the pipe
35 safety housing
36 sensor cartridge
37 flushing hole of the guide pipe
38 locking recess
39 seal seat
40 aperture in the support element
41 flushing hole of the support element
x axial direction

The invention claimed is:

1. A retractable fitting having a stopcock, comprising:
a stopcock housing for connection to a pipe or to a process chamber, the stopcock housing having a connection opening that opens into the pipe or process chamber;
a shut-off body arranged in the stopcock housing, the shut-off body being rotatable about a pivot axis relative to the stopcock housing, the shut-off body having a passage hole that merges in an open state of the stopcock into the connection opening of the stopcock housing, the connection opening being closed by the shut-off body in a closed state of the stopcock;
a support element arranged in the passage hole and operable to be introduced in the open state of the stopcock through the connection opening into the pipe or process chamber; and
a plurality of flushing lines in the stopcock, the plurality of flushing lines operable to conduct a flushing medium, the plurality of flushing lines being accessible from outside of the stopcock, the plurality of flushing lines being connected to and/or opening into the passage hole of the shut-off body at least in the closed state of the stopcock, one of the flushing lines extending through a wall of the stopcock housing and opening in the closed state of the stopcock into a front-side opening of the passage hole.

2. A retractable fitting in accordance with claim 1, wherein the flushing medium is a gas or a liquid.

3. A retractable fitting in accordance with claim 1, wherein a pressurized fluid is introduced into the pipe or process chamber.

4. A retractable fitting in accordance with claim 1, further comprising one or more bearing pins, the shut-off body being pivotally supported at the stopcock housing about the pivot axis by means of the one or more bearing pins, one of the flushing lines extending through one of the bearing pins.

5. A retractable fitting in accordance with claim 4, wherein the one or more bearing pins comprises two bearing pins, a second one of the flushing lines extending through a second one of the bearing pins.

6. A retractable fitting in accordance with claim 5, wherein the bearing pins are provided at mutually oppositely disposed sides of the shut-off body and each lie in a bearing recess provided in the stopcock housing.

7. A retractable fitting in accordance with claim 1, further comprising at least one sensor supported by the support element, the sensor operable to measure at least one physical property a fluid flowing and/or introduced in the pipe or process chamber.

8. A retractable fitting having a stopcock, comprising:
a stopcock housing for connection to a pipe or to a process chamber, the stopcock housing having a connection opening that opens into the pipe or process chamber;
a shut-off body arranged in the stopcock housing, the shut-off body being rotatable about a pivot axis relative to the stopcock housing, the shut-off body having a passage hole that merges in an open state of the stopcock into the connection opening of the stopcock housing, the connection opening being closed by the shut-off body in a closed state of the stopcock;
a support element arranged in the passage hole and operable to be introduced in the open state of the stopcock through the connection opening into the pipe or process chamber;
a plurality of flushing lines in the stopcock, the plurality of flushing lines operable to conduct a flushing medium, the plurality of flushing lines being accessible from outside of the stopcock, the plurality of flushing lines being connected to and/or opening into the passage hole of the shut-off body at least in the closed state of the stopcock; and
a guide pipe which is releasably connected to the shut-off body and in which the support element is displaceably guided, the guide pipe being separable together with the support element from the shut-off body in the closed state of the stopcock, the guide pipe being inserted into the passage hole.

9. A retractable fitting in accordance with claim 8, further comprising an adjustment apparatus connected between the support element and the guide pipe, the adjustment apparatus operable displace the support element in the guide pipe.

10. A retractable fitting in accordance with claim 8, further comprising continuous flushing holes provided in a wall of the guide pipe and a respective one of the flushing lines opens into the continuous flushing holes.

11. A retractable fitting in accordance with claim 8, wherein the support element has a cover at one end by which the guide pipe can be closed at an end facing the shut-off body.

12. A retractable fitting in accordance with claim 8, wherein the guide pipe is releasably connected to the shut-off body by at least one fastening means that is engaged in a safety housing on the stopcock housing in the open state of the stopcock, the fastening means being disengaged from the safety housing in the closed state of the stopcock.

13. A retractable fitting in accordance with claim 12, wherein the fastening means is a nut that is screwed onto a thread provided at the shut-off body.

14. A retractable fitting in accordance with claim 8, wherein the flushing medium is a gas or a liquid.

15. A retractable fitting in accordance with claim 8, wherein a pressurized fluid is introduced into the pipe or process chamber.

16. A retractable fitting having a stopcock, comprising:
- a stopcock housing for connection to a pipe or to a process chamber, the stopcock housing having a connection opening that opens into the pipe or process chamber;
- a shut-off body arranged in the stopcock housing, the shut-off body being rotatable about a pivot axis relative to the stopcock housing, the shut-off body having a passage hole that merges in an open state of the stopcock into the connection opening of the stopcock housing, the connection opening being closed by the shut-off body in a closed state of the stopcock;
- a support element arranged in the passage hole and operable to be introduced in the open state of the stopcock through the connection opening into the pipe or process chamber; and
- a plurality of flushing lines in the stopcock, the plurality of flushing lines operable to conduct a flushing medium, the plurality of flushing lines being accessible from outside of the stopcock, the plurality of flushing lines being connected to and/or opening into the passage hole of the shut-off body at least in the closed state of the stopcock;
- one or more bearing pins, the shut-off body being pivotally supported at the stopcock housing about the pivot axis by means of the one or more bearing pins, one of the flushing lines extending through one of the bearing pins; and
- another one of the flushing lines extending through a wall of the stopcock housing and opening in the closed state of the stopcock into a front-side opening of the passage hole.

17. A retractable fitting in accordance with claim 16, wherein the flushing medium is a gas or a liquid.

18. A retractable fitting in accordance with claim 16, wherein a pressurized fluid is introduced into the pipe or process chamber.

* * * * *